United States Patent [19]

Schulz

[11] Patent Number: 5,108,695
[45] Date of Patent: Apr. 28, 1992

[54] VENTILATING SYSTEM FOR AN EMERGENCY FEEDWATER ENCLOSURE IN A NUCLEAR POWER PLANT

[75] Inventor: Terry L. Schulz, Murrysville Boro, Pa.

[73] Assignee: Westinghouse Electric Corp., Pittsburgh, Pa.

[21] Appl. No.: 660,366

[22] Filed: Feb. 25, 1991

[51] Int. Cl.$^5$ .............................................. G21C 15/00
[52] U.S. Cl. ................................... 376/298; 376/392; 376/407
[58] Field of Search ............... 376/407, 392, 372, 298, 376/391, 282, 283, 299, 277; 976/DIG. 202; 60/646, 657; 417/76, 151

[56] References Cited

U.S. PATENT DOCUMENTS

| | | | |
|---|---|---|---|
| 3,791,923 | 2/1974 | Bhan | 376/300 |
| 3,937,652 | 2/1976 | George | 376/298 |
| 4,478,784 | 10/1984 | Burelbach | 376/298 |
| 4,571,323 | 2/1986 | Costes | 376/283 |
| 4,645,641 | 2/1987 | Nicolai et al. | 376/283 |
| 4,687,626 | 8/1987 | Tong | 376/298 |
| 4,765,946 | 8/1988 | Dagard et al. | 376/282 |
| 4,777,013 | 10/1988 | Wolters et al. | 376/283 |
| 4,818,475 | 4/1989 | Gluntz et al. | 376/282 |
| 4,889,682 | 12/1989 | Gou et al. | 376/283 |

Primary Examiner—Daniel D. Wasil
Attorney, Agent, or Firm—M. G. Panian

[57] ABSTRACT

A ventilating system for an enclosure in a nuclear power plant is provided. The enclosure houses an emergency feedwater pump and its driver steam turbine. An eductor mounted in the enclosure is supplied with steam exhausting from the driver steam turbine. The steam jet formed by the eductor draw hot air out of the enclosure, thereby preventing the excessive build-up of heat in the enclousre. An air inlet formed in another wall of the enclosure supplies the enclosure with cool ambient air. The eductor and air inlet are situated to ensure the incoming air flows over the pump, thereby cooling it. A duct transports the steam/air mixture discharged by the eductor to the atmosphere.

9 Claims, 2 Drawing Sheets

VENTILATING SYSTEM FOR AN EMERGENCY FEEDWATER ENCLOSURE IN A NUCLEAR POWER PLANT

BACKGROUND OF THE INVENTION

The current invention concerns a system for ventilating an enclosure housing equipment which forms a part of the emergency feedwater system in a nuclear power plant. More specifically, the invention concerns a system for ventilating an enclosure, housing a steam turbine and an emergency feedwater pump driven by the steam turbine, using an eductor powered by steam exhausted from the steam turbine.

Nuclear power plants frequently employ an emergency feedwater system to provide a back-up source of feedwater to the steam generator in the event that an accident or upset in the primary feedwater system causes the water level in the steam generator to drop below the minimum desired level. Such an emergency feedwater system may include an emergency feedwater storage tank, containing sufficient water for approximately one day of operation of the steam generator, a motor driven pump, and a steam turbine driven emergency feedwater pump for transferring water from the tank to the feedwater inlet to the steam generator. The steam turbine driven pump serves to deliver feedwater to the steam generator in the event of a loss of electrical power.

In order to protect the emergency feedwater pump and its driver steam turbine from harm due to hurricanes, tornadoes, projectiles, etc., this equipment is enclosed in a concrete pump room. The pump room itself may be enclosed within a large auxiliary building adjacent to the containment. The life of the pump is severely reduced by exposure to excessive environmental temperatures. Unfortunately, the steam turbine and its associated piping, and the pump itself, transfer heat into the pump room. Hence, it is important to ventilate the pump room to ensure the excessive build-up of heat is avoided. An electrically operated fan can be used to draw ventilating air through the pump room. However, it is vital that the turbine driven emergency feedwater pump be operable during electric power failures.

Probabilistic risk analysis has shown that loss of all AC electrical power poses one of the highest risks to the safety of the public. Accordingly, it would be desirable to provide a ventilating system for the pump room which was not dependent on electrical power.

SUMMARY OF THE INVENTION

It is an object of the current invention to provide a reliable system for ventilating an enclosure in a nuclear power plant.

It is a further object of the current invention that the ventilating system be capable of operating when there has been a loss of all electrical power.

It is still another object of the current invention that the ventilating system be driven by the same steam used to drive the turbine and capable of ventilating an enclosure housing an emergency feedwater pump and its driver steam turbine during an indefinite period of operation of the pump.

These and other objects are accomplished in a nuclear power plant having an emergency feedwater system comprised of a water storage tank, a feedwater pump, and a steam turbine driving the feedwater pump. The steam turbine receives and exhausts steam generated by a steam generator. Both the pump and the steam turbine are enclosed in a pump room ventilated by a stream driven eductor mounted in the pump room. The eductor is supplied with steam exhausting from the steam turbine and draws hot air out of the pump room by entraining the hot air in a steam jet formed within the eductor. An air inlet is formed in another wall of the pump room and is located to ensure that the air drawn into the room by the eductor flows over the pump, thereby preventing the excessive build-up of heat in the pump room in cooling the pump.

DESCRIPTION OF THE PREFERRED EMBODIMENT

Figure 1:
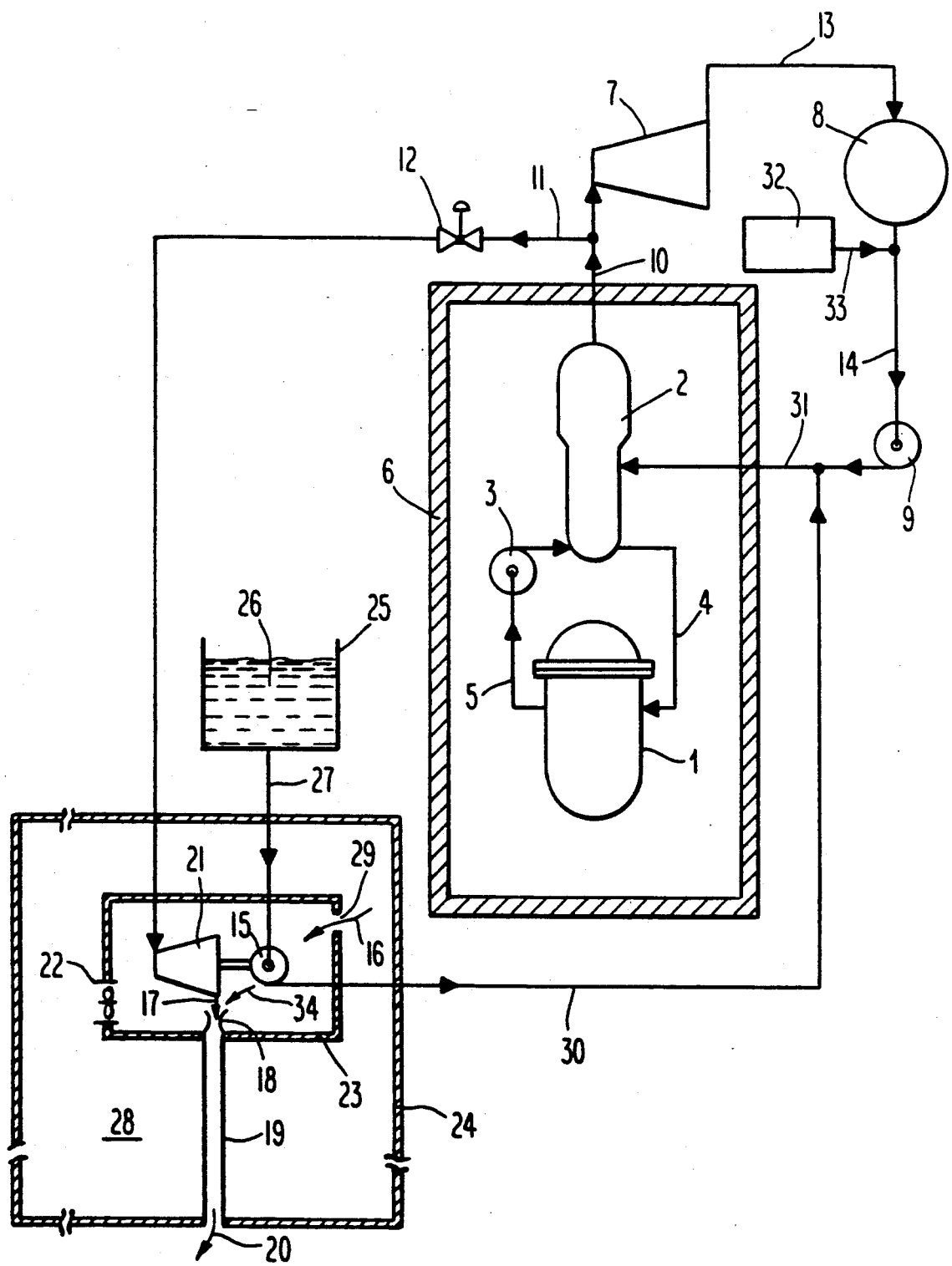
FIG. 1 is a schematic diagram of a portion of the steam and feedwater supply systems in a nuclear power plant.

There is shown in FIG. 1 a schematic diagram of a portion of the steam and feedwater supply systems in a nuclear power plant. A nuclear reactor 1 is cooled by water circulated through a steam generator 2. The water 4 from the steam generator 2 enters the reactor 1. After flowing through the reactor core, not shown, the now heated water 5 is returned to the steam generator by action of the reactor coolant pump 3. In the steam generator 2, the cooling water 5 is cooled by transferring its heat to feedwater 31, thereby converting a portion of the feedwater to steam 10. During normal operation, essentially all of the steam 10 produced by the steam generator 2 is directed to a main steam turbine 7. The main steam turbine 7 drives an electric generator, not shown, thereby producing electrical power. Steam 13 exhausting from the steam turbine 7 is liquified in a condenser 8. The condensate 14, together with any required make-up water 33 from a make-up system 32, is supplied to the main feedwater pump 9. The pressurized feedwater 31 is then delivered to the steam generator 2 where it is converted to steam 10, as a result of heat transferred from the heated cooling water 5, and the cycle is repeated. As indicated in FIG. 1, the nuclear reactor 1 and steam generator 2 are enclosed by a containment 6.

In order to insure that there is an adequate supply of feedwater to the steam generator 2 to sufficiently cool the cooling water 5 so as to avoid overheating the reactor 1, an emergency feedwater system is employed. The emergency feedwater system is activated whenever, as a result of an accident or other flow upset in the primary feedwater system discussed above, the level of the water in the steam generator 2 drops below a predetermined height. Operation of the emergency feedwater system is initiated by opening a valve 12 which directs a portion 11 of the steam 10 produced by the steam generator 2 to an emergency feedwater steam turbine 21 via an interconnecting steam supply pipe. The emergency feedwater steam turbine 21 receives the steam 11 and expands it, thereby producing shaft power which drives an emergency feedwater pump 15. The pump 15 draws water 27 from an emergency feedwater storage tank 25. The tank 25 contains sufficient water 26 for approximately 24 hours of operation of the steam generator 2. Pump 15 transfers the water to piping carrying the main feedwater 31, whereupon it enters the steam generator 2.

As indicated in FIG. 1, the emergency feedwater pump 15 and steam turbine 21 are enclosed in a pump room 23. The pump room 23, which may be formed from concrete, serves to protect the pump 15 and steam turbine 21 from severe weather, such as hurricanes and tornadoes, as well as projectiles or other potential sources of harm. During operation, the steam turbine 21, pump 15 and associated piping transfer a significant quantity of heat into the air within the room 23. The life of the pump 15 will be severely limited if the environmental temperature in the pump room becomes excessive - for example, the life of some pumps is reduced to several hours if the surrounding air temperature exceeds 120° F. Thus, it is vital that the air temperature in the pump room be limited.

One possible means of limiting the pump room air temperature is to provide ventilation by an electrically powered exhaust fan 22 mounted in one wall of the pump room 23, as indicated in FIG. 1. The fan 22 draws air 16 from outside the pump room 23 through an air inlet 29 formed in another wall of the room. However, such a fan would be inoperative in the event of a loss of electrical power.

Figure 2:
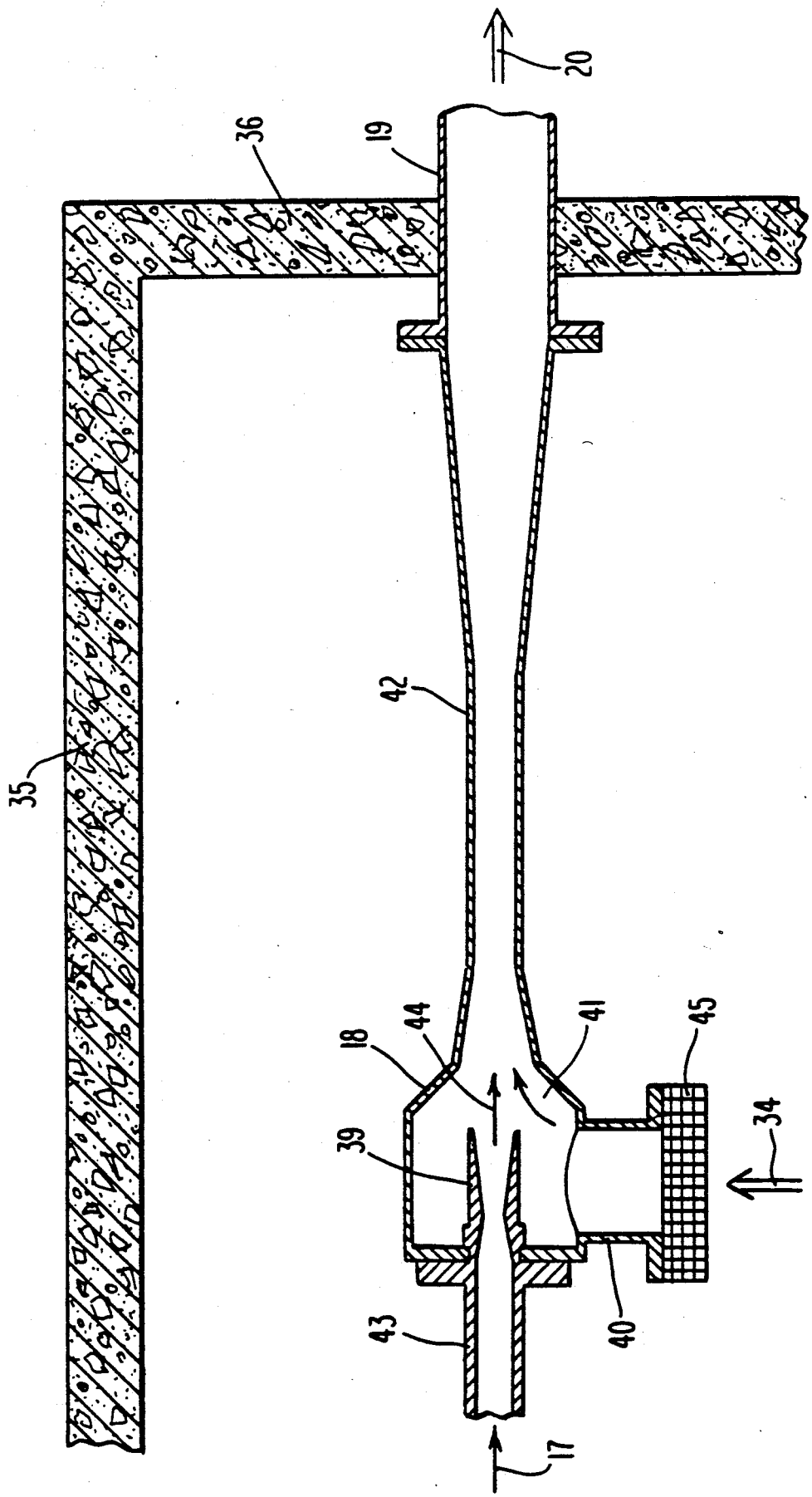
FIG. 2 is a vertical cross-section through the eductor.

Consequently, according to the current invention, pump room 23 ventilation is also accomplished by a steam turbine driven eductor 18 mounted in the pump room, as shown in FIG. 2. The eductor 18 is supplied with steam 17 exhausting from the steam turbine 21 via pipe 43 which mates with the rear face of the eductor. A nozzle 39 is disposed within a suction chamber 41 formed within the eductor 18. The nozzle 39 forms a steam jet 44 which entrains the hot air 34 in the pump room 23 drawn into the suction chamber 41 through the eductor inlet 40. The steam/air mixture discharged from the suction chamber 41 then flows through a diffuser 42 and thence discharges outside the building via a duct 19 extending through a wall 36 of the pump room.

As shown in FIG. 1, the eductor 18 is not mounted on the same side of the room as the air inlet 29. Rather, the eductor and air inlet are oriented so that the pump 15 is situated between them, so as to ensure that the incoming air 16 flows over the pump 15, thereby cooling it. To take advantage of natural convective currents in the pump room 23, the eductor 18 should ideally be located near the ceiling 35 of the room, as shown in FIG. 2, and the air inlet 29 near the floor.

As indicated in FIG. 1, the pump room 23 is enclosed in a large auxiliary building 24 near, but external to, the containment 6 which encloses the nuclear reactor 1 and steam generator 2. The building 24 houses various pieces of equipment and forms an air space 28 from which the pump room air inlet 29 draws. During normal operation, the air in the building 24 is cooled by air conditioning equipment, not shown. The air conditioning ensures that the temperature of the air space 28 does not become excessive as a result of heat transferred from the equipment operating within the building. During a loss of electrical power, when operation of the eductor 18 is most vital, the air in building 24 will not be cooled since the air conditioning equipment, like fan 22, is electrically powered. However, since almost all the heat generating equipment in building 24 is also electrically powered, there would be little heat-up of the air in building 24. Thus, operation of the eductor 18 will draw air 16 into the pump room 23 from the building 24. This will, in turn, draw ambient air surrounding the building 24 into the building via the normal air conditioning equipment intakes, not shown, with little heat-up of the ambient air occurring prior to the introduction of the air 16 into the pump room 23.

As shown in FIG. 1, a duct 19 transports the steam/air mixture 20 discharged by the eductor 18 to the atmosphere surrounding the building 24.

Although the invention has been described in terms of ventilating a feedwater pump enclosure, the teaching described herein is equally applicable to ventilating other pump enclosures, such as an enclosure housing steam turbine driven safety injection pumps in a boiling water reactor.

The present invention may be embodied in other specific forms without departing from the spirit or essential attributes thereof and, accordingly, reference should be made to the appended claims rather than to the foregoing specification, as indicating the scope of the invention.

I claim:

1. A nuclear power plant comprising:
   (a) a steam generator supplied with feedwater and having means for converting said feedwater to steam;
   (b) an enclosure forming a first air space for housing equipment therein; said equipment comprising means for supplying said feedwater to said steam generator, and a steam turbine, and
   (c) an eductor in air flow communication with said enclosure and in steam flow communication with said steam turbine for ventilating said enclosure.

2. The nuclear power plant according to claim 1 wherein said equipment comprises a pump driven by a steam turbine.

3. The nuclear power plant according to claim 2 wherein said enclosure has an air inlet, and wherein said pump is disposed between said air inlet and said eductor.

4. The nuclear power plant according to claim 1 further comprising a building forming a second air space around said enclosure, and means for placing said eductor in flow communication with the environment surrounding said building.

5. The nuclear power plant according to claim 4 wherein said enclosure has an air inlet in airflow communication with said second air space.

6. In a nuclear power plant having a nuclear reactor cooled by water circulated through a steam generator supplied with feedwater, said steam generator converting said feedwater to steam, an emergency feedwater supply system, comprising:
   (a) a storage tank containing water;
   (b) an emergency feedwater steam turbine receiving and exhausting at least a portion of said steam from said steam generator;
   (c) an emergency feedwater pump driven by said emergency feedwater steam turbine; and
   (d) means driven by steam exhausted from said turbine for drawing air over said emergency feedwater pump.

7. The emergency feedwater supply system according to claim 6 wherein said air drawing means is an eductor.

8. The emergency feedwater system according to claim 7 wherein said eductor is driven by said steam exhausting from said emergency feedwater steam turbine.

9. In combination with a pump driven by a steam turbine receiving and exhausting steam, an air filled enclosure for housing said pump and turbine, the enclosure comprising:
(a) a plurality of walls enclosing said pump;
(b) an air inlet formed in a first one of said walls for supplying air to said enclosure; and
(c) an eductor mounted in said enclosure, said eductor having:

(i) means for receiving steam exhausting from said steam turbine and forming said steam into a jet;
(ii) means for receiving said air filling said enclosure;
(iii) means for entraining said air filling said enclosure in said steam jet; and
(iv) means for discharging said steam forming said jet and said entrained air from said enclosure.

* * * * *